Nov. 22, 1955 E. BRUCE ET AL 2,724,746

COMMUNICATION SYSTEM

Filed Aug. 16, 1952 3 Sheets-Sheet 1

INVENTORS: E. BRUCE
W. A. REENSTRA

BY

ATTORNEY

COMMUNICATION SYSTEM

Filed Aug. 16, 1952 3 Sheets-Sheet 2

INVENTORS: E. BRUCE
W. A. REENSTRA
BY
ATTORNEY

COMMUNICATION SYSTEM

Filed Aug. 16, 1952 3 Sheets-Sheet 3

INVENTORS: E. BRUCE
W. A. REENSTRA
BY
ATTORNEY

United States Patent Office 2,724,746
Patented Nov. 22, 1955

2,724,746

COMMUNICATION SYSTEM

Edmond Bruce, Fairhaven, and Willard A. Reenstra, Rutherford, N. J., assignors to Bell Telephone Laboratories, Incorporated, New York, N. Y., a corporation of New York Application August 16, 1952, Serial No. 304,810

16 Claims. (Cl. 179—26)

This invention relates to communication systems and more particularly to telephone systems wherein a number of telephone subscribers share a number of trunks for connection to a central office.

In an effort to reduce the cost of the telephone plant attempts have been made in densely populated areas to concentrate a large number of subscriber lines and connect them to a central office by a fewer number of trunks. Past attempts at line concentration have not been entirely successful, however, due to the necessity for a large number of additional control leads from the central office to control the switching required at the concentrator, power supply problems, maintenance problems, and the complexities of the switching and control networks involved.

One type of switching network that can be employed readily in concentrators, whether of the remote line type or included in the central office switching network, comprises a plurality of cross points that define the possible paths between the input and output leads. In a rectangular switch, having a number of inlets in one coordinate and a number of outlets in the other coordinate, the device which connects one particular inlet with one particular outlet, at their intersection, is commonly called a cross point and shall be so referred to below. Advantageously, these cross points may themselves define the talking paths through the concentrator switching network and may advantageously comprise gas tubes, transistors, or other devices capable of operating on the application of marking potentials thereto.

When the concentrator is not in the central office but is remote thereto and specifically when it is in the vicinity of a large number of subscribers, the central office is not directly in information communication with the subscriber's lines. However, it is essential that the central office be able to ascertain at any time whether a particular telephone is idle, whether the subscriber is requesting a connection so that he may originate a call, or whether the subscriber is already busy on a prior call. While the central office must be capable of obtaining this information, it must also send out to the subscriber lines control signals marking a particular one of the subscriber lines to cause breakdown of one cross point connected thereto in the remote line concentrator switching network. In order to obtain the greatest saving in the telephone plant it is desirable that the number of extra control leads etxending from the central office required to pass these information signals to and from the remote line concentrator be kept at a minimum.

It is a general object of this invention to provide an improved communication system wherein a large number of lines may be connected to a central station by a smaller number of common trunks with a concomitant saving in wire in the telephone plant.

It is a further object of this invention to enable the testing of each of these lines and the marking thereof with appropriate potentials to cause connection of any particular line to a trunk by a switching network adjacent the lines and remote from the central station.

It is another object of this invention to reduce the extra control leads required for the testing and marking of the lines. More particularly it is an object of this invention to provide for the testing and marking of the individual lines without any additional trunks required as control, information, or power trunks.

A still further object of this invention is the provision of an improved telephone system wherein a number of subscriber lines are connected by a cross point switching network to a smaller number of concentrator trunks from the central office to the concentrator switching network whereby considerable savings in wires and trunks is attained.

These and other objects of this invention are attained in one specific illustrative embodiment comprising a telephone system wherein a line test and mark translator is connected to the individual subscriber lines and to the central office and testing of the lines and marking of the lines proceed upon a code basis. Further, in this specific illustrative embodiment of this invention, the direct current information and control circuits are superimposed onto the talking path alternating current circuits so that no additional control or information trunks or leads are required. More particularly, in this specific illustrative embodiment the trunk marking potentials, cross point holding current, and subscriber loop current are transmitted to the remote line concentrator over one wire of the concentrator trunk from the central office and the line marking and testing signals are transmitted to the line mark and test translator over the other wire of each of the concentrator trunks.

In accordance with one aspect of our invention, the line test and mark translator comprises a plurality of diodes, varistors or other rectifying elements connected between certain lines and a control wire from the central office which, as mentioned above, is one wire of the talking path trunk. These diodes are connected in accordance with a code the general equation of which is $$C=\frac{n(n-1)(n-2)\ .\ .\ .\ (n-r+1)}{r!}$$

where C is the total number of lines to be tested, $n$ the number of control or information wires being utilized, and $r$ the number of those wires employed in any one testing operation. Each line is connected by diodes to $r$ different information wires. In one specific illustrative embodiment of this invention wherein it is desired to give forty-five subscriber lines access to the central office over ten trunks, and thus there are ten control or information wires, these wires are taken two at a time for a two-out-of-ten code basis.

Testing of the lines is attained by changing the voltage applied to the two wires connected by diodes to the line being tested, when $r=2$, and noting the change in current in the wires in the central office. Marking of the lines is also attained by varying the potential applied to the two wires connected by diodes to the line to be marked, the change in voltage being such that the difference between the marking potential applied to a concentrator trunk and that now applied to a subscriber line is sufficient to cause breakdown of the designated cross point.

While the above general description and the specific description below are of a telephone system it is to be understood that our invention is equally applicable to other communication systems, such as teletypewriter, telegraph, computer or other information dependent systems where it may be desirable to afford connection from a large number of lines or terminals at some remote point to a central station over a smaller number of common or concentrator trunks.

It is one feature of this invention that line testing and line marking signals and information be transmitted to and from the central office by a translator operable in accordance with a predetermined code. More specifically it is a feature of this invention that a given number of information leads be utilized out of the total number for the testing or marking of any particular line and that that particular line be connected to those information leads by diodes or rectifying elements.

It is a further feature of this invention that the information leads for transmission of this information to and from the central office comprise one wire of the talking path trunk between the central office and the remote line concentrator whereby no separate control wires or trunks are required.

It is a still further feature of this invention that the trunk marking potentials, cross point holding and subscriber loop currents be applied to the other wire of each of the talking path trunks.

It is a further feature of this invention that the translator be reversible, i. e. allow passage of information in either direction depending upon the terminating conditions. Thus it is a feature of this invention that the translator can convert coded information from the central office into line circuit controls and, conversely, can convert line circuit changes into coded test information at the central office.

A complete understanding of this invention and of these and various other features thereof may be gained from consideration of the following detailed description and the accompanying drawing, in which.

Figure 1:
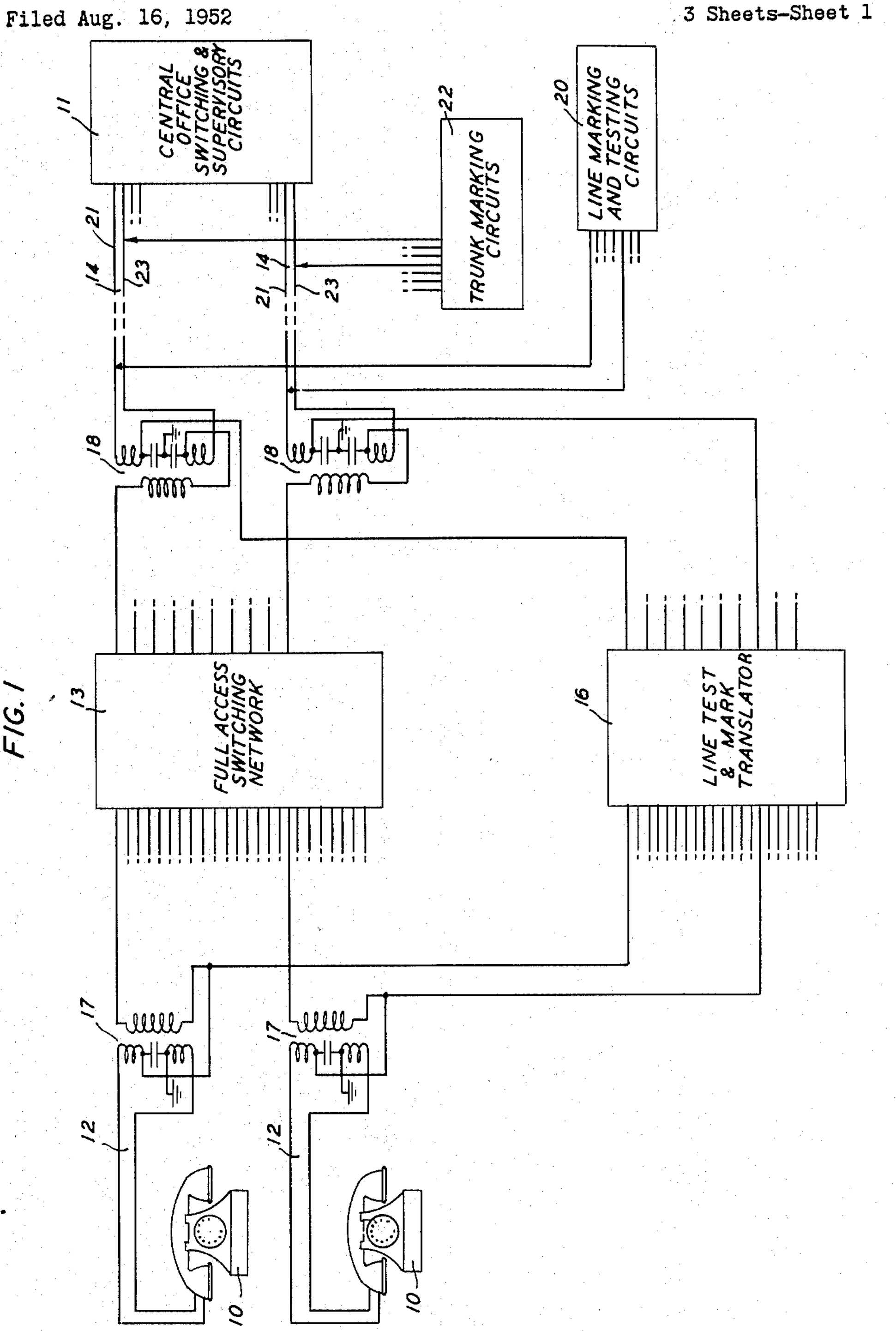
Fig. 1 is a schematic representation, largely in block diagram form, of one specific illustrative embodiment of our invention comprising a telephone system.
Figures 3, 4:
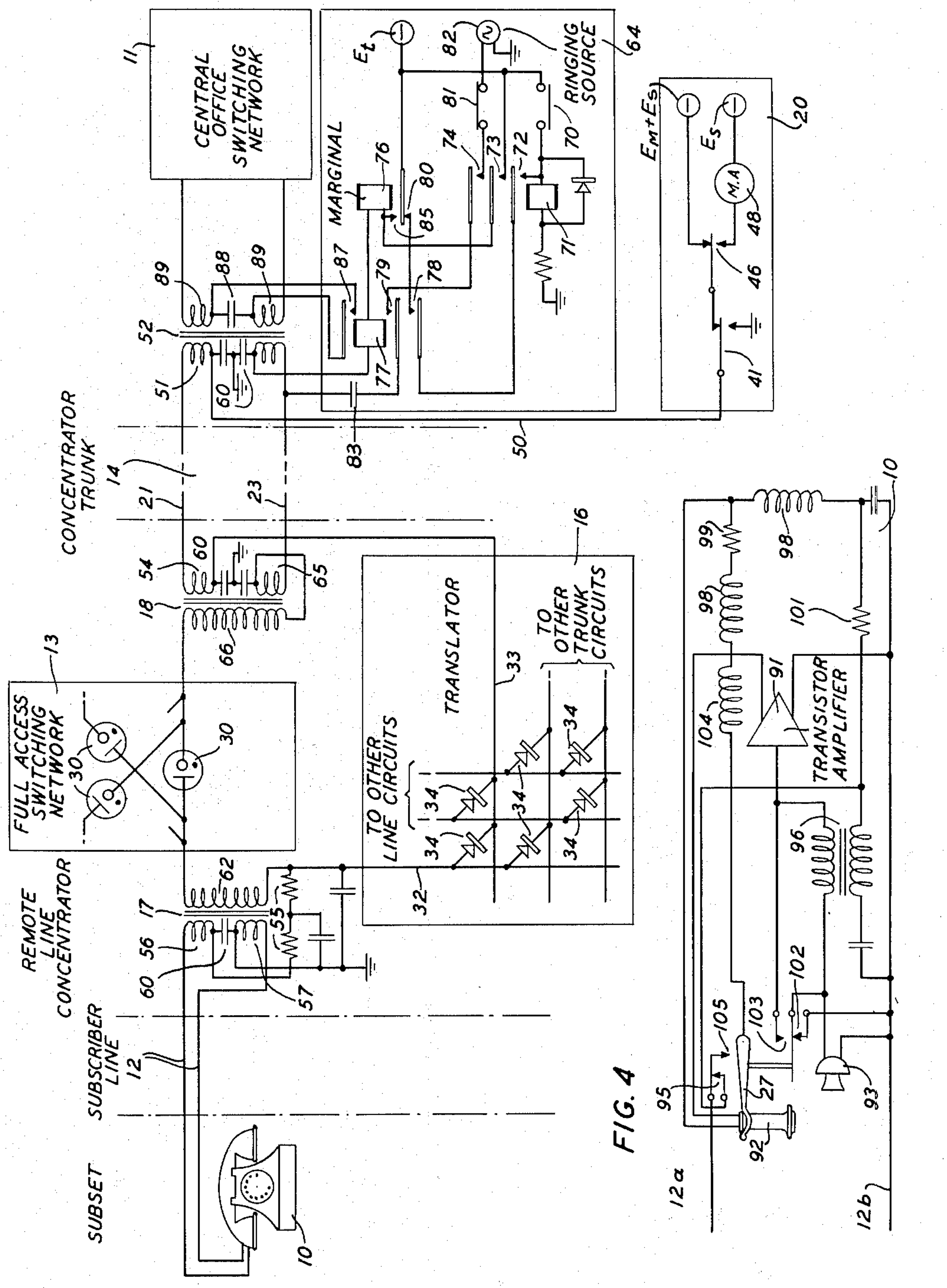

Fig. 3 is a schematic representation of the telephone system of Fig. 1 showing a connection through on one particular concentrator trunk to one particular subscriber line and showing particularly the employment of the wires of the talking path trunks for the control leads of the direct current control circuits; and Fig. 4 is a schematic representation of one particular telephone subset employable with a telephone system in accordance with our invention.

Turning now to the drawing, the specific illustrative embodiment of our invention shown in Fig. 1 comprises a telephone system in which a plurality of subscriber telephones 10 have access to a central office switching network 11 through individual subscriber lines 12, a full access switching network 13, and a number of common concentrator trunks 14, the number of trunks 14 being less than the number of subscriber lines 12. The switching network 13 and a line test and mark translator 16 are situated between the subscriber lines 12 and the concentrator trunks 14 and electrically connected thereto by transformers 17 and 18, described below in detail with reference to Fig. 3. In the central office, a line marking and testing circuit 20 is connected to one wire 21 of each of the concentrator trunks 14 and a trunk marking circuit 22 is connected to the other wire 23 of each trunk 14.

The full access switching network 13 may advantageously comprise a single stage of connections between each line and each trunk, each possible connection between any line and any trunk being known as a cross point. These cross points may advantageously comprise two-element gas tubes, transistors, or other asymmetric elements capable of being broken down on the application of marking potentials thereacross. Advantageously the gas tubes, self-locking transistors, or other self-locking elements which define the cross points are themselves elements in the talking path between the central office and the subscriber, but if desired conduction through a cross point may be utilized to operate a relay so that the talking path is defined by metallic contacts. A multistage cross point switching network may also advantageously be employed if it is desired to utilize the switching network 13 with a large number of subscribers. A four-stage switching network employing gas tubes at the cross points for the talking path through the network is disclosed in Patent 2,684,405, issued July 20, 1954, to E. Bruce and H. M. Straube. In the specific illustrative embodiment of this invention described below, there is employed a single stage switching network utilizing gas tubes at the cross points and defining the talking path through the switching network. By employing gas tubes having a small negative resistance characteristic in the operating region of the voice currents, some of the positive resistance of the two-way transmission paths can be cancelled or compensated for with a concomitant reduction in the overall transmission loss.

The switching circuits 11 in the central office may be of any known type such as manual, step-by-step, cross bar, etc. For purposes of the description of this ivention it will simplify matters if a manual office is assumed and the trunk marking and line marking and testing functions are described in terms of manual operation.

As the subscriber lines 12 are not directly connected to the central office it is necessary that certain information and control signals be transferred to and fro between the central office and the switching network 13 and subscriber lines 12. The control information for setting up a connection through the switching network 13 must originate in the central office and be passed out from it to the switching network 13. At the same time line test information indicating whether a particular subscriber telephone 10 is busy, idle, or requesting service must be transmitted in the other direction from the subscriber's line to the central office. In accordance with a feature of our invention, the marking of the subscriber's line to mark the cross points connected thereto in the switching network 13 and the testing of the subscriber's lines are accomplished by the line test and mark translator 16. Further in accordance with a feature of our invention, the translator 16 is connected to the central office over one wire 21 of each of the trunks 14 whereby there is attained a further economy and saving in length of wire necessary. The operation of the translator in testing and marking the subscriber lines can best be understood from a consideration of Fig. 2 of the drawing while the separation of the direct current and alternating current paths so that the two wires of the talking trunk 14 can be employed for control purposes can best be understood from a consideration of Fig. 3 of the drawing.

Figure 2:
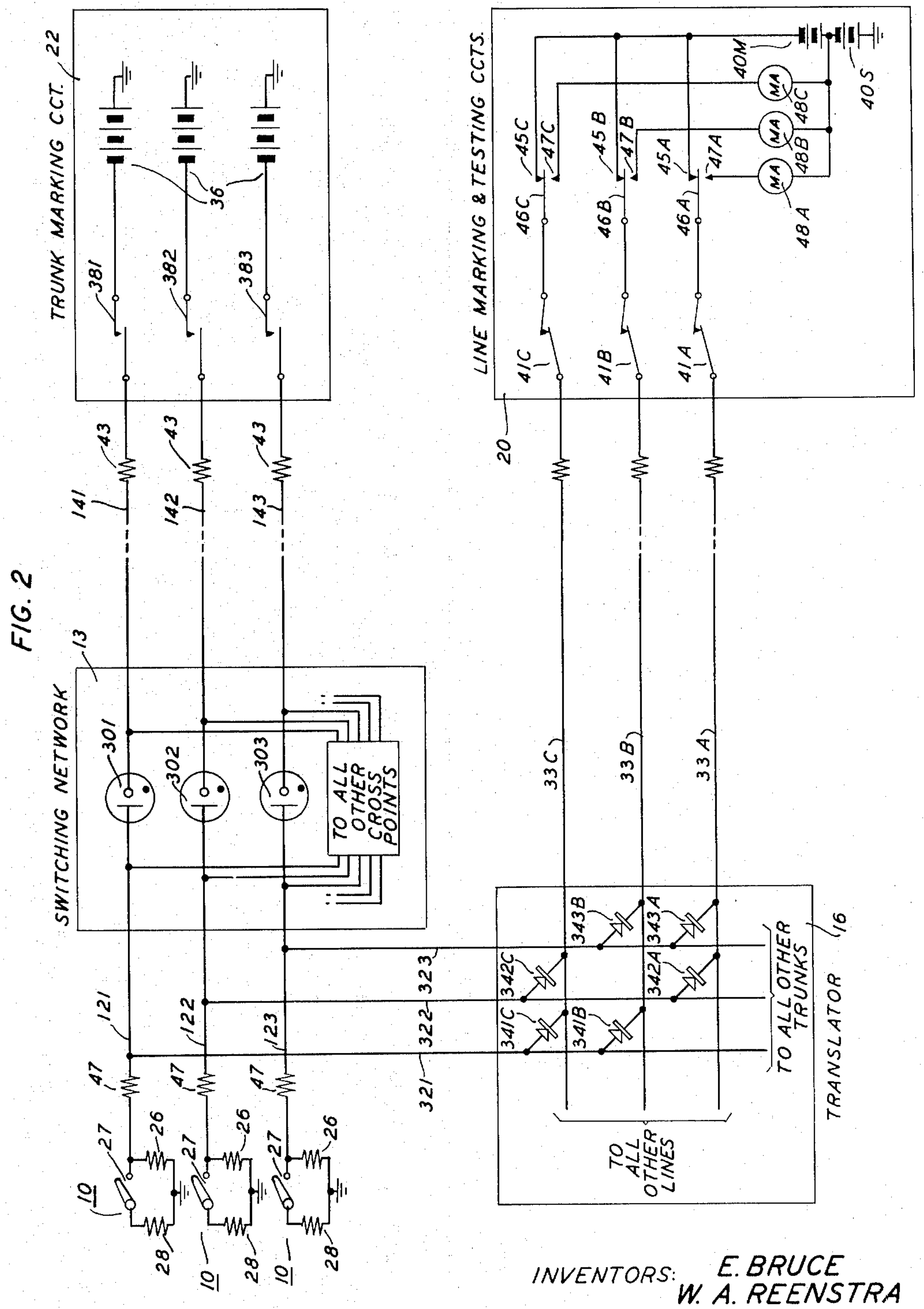
Fig. 2 is a simplified schematic representation of the direct current control circuits of the telephone system of Fig. 1, showing particularly the line marking and testing translator and the operation thereof in accordance with our invention.

Turning now to Fig. 2, there is shown a schematic representation of only that portion of our novel communication system, as shown in Fig. 1, concerned with the testing and marking functions; thus only direct current control paths are depicted and no attempt is made in Fig. 2 to depict the alternating current or voice frequency current paths. As seen in the figure, each of the telephone instruments 10 can be considered as comprising a resistance 26 at all times connected between the subscriber line 12 and ground. In the following description various identical elements of the system are identified by a common number with an additional digit and/or letter to designate the particular element. Thus line 121 in Fig. 2 indicates the line 12 for subscriber number one. When the telephone is in an on-hook position, i. e., the telephone 10 is not connected to the line 12 by the switch hook 27, only this resistance 26 is between the line 12 and ground. However, when the telephone is in an off-hook position, i. e., the telephone is connected to the line 12 by the switch hook 27, the resistance 28 of the telephone instrument itself is in parallel with the resistance 26 so that the apparent resistance seen by the line 12 is considerably less. Three lines 121, 122 and 123 are shown extending into the switching network 13, which, as shown, may comprise a plurality of cross points defined by gas-tubes 30. Only three trunks 141, 142 and 143 are shown entering the other side of the switching network 13. It is to be understood, however, that a large number of both subscriber lines 12 and trunks 14 may be employed and that each subscriber line 12 is capable of connection by a gas-tube 30 to each of the trunks 14. In one specific illustrative embodiment of the invention forty-five subscriber lines 12 may be connected by the switching network 13 to ten trunks 14. The gas tubes 30 may advantageously be of the type described in M. A. Townsend application Serial No. 169,121, filed June 20, 1950.

Each of these subscriber lines is connected by a line 32 to the translator 16. Similarly a plurality of information leads 33 can be considered as extending from the central office to the translator 16. Each of the lines 32 is connected by rectifiers 34, such as varistors or gas-tubes, to two and only two of the information leads 33 in the specific embodiment depicted, whereby the translator operates in a two-out-of-ten basis so that forty-five lines can be controlled by ten leads. If rectifiers 34 are gas-tubes, they may be of two or more electrodes. As mentioned above, and further discussed below, the ten leads 33 advantageously comprise one wire of the talking trunk 14. The line testing and marking circuits 20 are connected to the leads 33 and the trunk marking circuits 22 to the trunks 14.

Let us first consider the operation of the circuit in marking the particular cross point, i. e., gas-tube 30, in the switching network 13 that it is desired to break down to define a talking path through from a particular subscriber line 12 to a particular trunk 14. Under normal conditions each of the trunks 14 has applied to it a negative voltage $E_t$, as from voltage sources 36 each connected to a trunk 14, this voltage being large enough to break down or operate the cross point, i. e., the tube 30. A trunk marking switch 38 is interposed between each voltage source 36 and trunk 14 and is normally open. Similarly normally a negative voltage $(E_m+E_s)$ is applied to each of the leads 33 and thus to the lead side of each of the rectifiers 34 from a pair of voltage sources 40*m* and 40*s* in series. This voltage is applied through normally closed line marking switches 41. When it is desired to complete a voice or talking path between a subscriber line and a trunk, such as line 123 and trunk 143 through tube 303, switch 383 is closed by the operator in the central office thereby applying the voltage $E_t$ to tube 303 and to each of the other tubes connected between trunk 143 and each of the other subscriber lines. While voltage $E_t$ is sufficient to break down the gas tubes connected to trunk 143, none of them will break down due to the bucking effect of the voltage $E_m$ and $E_s$. However, if the two information leads 33A and 33B, which are connected to line 123 through rectifiers 343A and 343B and line 323, are opened, as by opening the two line marking switches 41A and 41B the voltage on the line side of all the gas-tubes connected to line 123 will be reduced to zero and thus the one particular cross point between the line 123 and the marked trunk 143 will be operated by the gas-tube 30 breaking down. Paths to other lines or other trunks will not be broken down because the voltage across the cross points for those paths is either zero or the difference between $-E_t$ and $-(E_m+E_s)$, which is insufficient to operate the cross point. Sequential lockout, i. e., lockout to prevent a new line from connecting to an already established trunk, is obtained if the trunk resistance 43 is sufficiently large.

It is thus apparent that by opening any two switches 41 in any of the ten information leads 33 any one of the forty-five subscriber lines 12 can be marked. While the specific translator depicted operates on a two-out-of-ten basis so that forty-five lines can be controlled by ten leads, it is of course to be understood that translators operating on other codes could be employed with equal facility in a combination in accordance with our invention. The general equation of such codes is $$C=\frac{n(n-1)(n-2)\ .\ .\ .\ (n-r+1)}{r!}$$

where C is the total number of subscriber lines, $n$ the number of control or information leads; and $r$ the number of those leads utilized in any one operation. Thus in the specific example disclosed, $n=10$, $r=2$, and $C=45$. Other codes that may be given as examples and which show the application of our invention to larger groups of subscribers are:

| $r$ | $n$ | $C$ |
|---|---|---|
| 3 | 8 | 56 |
| 2 | 12 | 66 |
| 3 | 10 | 120 |
| 5 | 10 | 252 |
| 3 | 20 | 1,140 |
| 3 | 41 | 10,660 |
| 8 | 16 | 12,870 |

It can be shown that the most number of lines that can be controlled by a given number of leads occurs in a code in which $r=\frac{1}{2}n$, such as a five-out-of-ten code or an eight-out-of-sixteen code. However, as the application of the principles of our invention are the same we have chosen to describe it with reference to the simpler two-out-of-ten code depicted.

In the testing of a subscriber line the same code is employed by the translator so that the forty-five lines 12 of this specific embodiment can be tested by a choice of a particular two of the ten information leads 33. Each of the information leads 33 is connected to the negative voltage sources 40*m* and 40*s* in series through normally closed contacts 45 of a line test switch 46. When it is desired to test a particular line, such as subscriber line 121, the switches 46 of the two information leads 33 which are connected to the line being tested by rectifiers or diodes 34 are thrown from their normally closed position to their test position, thereby connecting the leads 33 through contacts 47 and an ammeter or other current indicating device 48 to just the voltage source 40*s* alone, so that the voltage applied to these information leads drops from $-(E_m+E_s)$ to just $-E_s$. As subscriber line 121 is connected to leads 33B and 33C through rectifiers 341B and 341C, line testing switches 46B and 46C are moved to the test position. Since all other lines sharing either information lead 33B or 33C, such as lines 122 or 123, are also connected to a more negative information lead, such as lead 33A which still has applied to it the full voltage $-(E_m+E_s)$, diode or rectifier 342C between line 122 and information lead 33C and diode or rectifier 343B between line 123 and information leads 33B will both be back biased. Therefore only current contributions from line 121 can be present on information leads 33B and 33C, and the value of the current flowing in these leads, as determined by the ammeters 48B and 48C, is dependent entirely upon the condition of the line 121. If the telephone 10 connected to line 121 is idle the value of the current is determined by the resistance 26 and will be comparatively low. If the telephone is off-hook and the subscriber is requesting new service, the current will be considerably larger due to the lower resistance 28 of the telephone now terminating the line 121 in parallel with the resistance 26. The third possible condition to be tested is that of a busy line when a call is already set up to that particular subscriber. When such is the case one of the cross points, such as defined by gas-tube 301, to line 121 is closed and cross point holding current from a voltage source 36 flows through the cross point and the telephone subset to ground. This current flows through a resistance 47 in the subscriber's line which may be the inherent resistance of the subscriber's line and produces a voltage drop across this resistance greater than either $E_m$ and $E_s$. This voltage is in the direction to back bias both of the translator rectifiers 34 connected to line 321 and thus no current will flow in the information leads 33B and 33C under this condition. Thus the information received at the central office for the three tested conditions can be summarized as follows:

| Line Condition | Reading of Ammeter 48 |
| --- | --- |
| Idle | Low Value of Current. |
| Requesting new Service | High Value of Current. |
| Busy on a prior Call | No Current. |

As noted above Fig. 2 and the description pertaining thereto was only concerned with the control and test features of our invention, and no consideration was given either to the voice transmission paths or to the integration of the control circuits with the voice transmission paths. Turning now to Fig. 3 there is shown one possible voice transmission path comprising one subscriber line 12 and one concentrator trunk 14 connected by one cross point 30 in the switching network 13. It is to be understood that each subscriber line 12 is capable of connection to any concentrator trunk 14 but as the principles of operation of our novel communication system can be readily understood from a consideration of but one of the possible transmission paths, the drawing has not been encumbered by an inclusion of other possible paths, which can be considered as basically duplicates of the one depicted. Basically the voice path consists of a balanced line from the subscriber's subset 10 to the remote line concentrator, an unbalanced line through the concentrator switching stage, and a balanced concentrator trunk to the central office. By employing an unbalanced circuit at the concentrator switching stage, in accordance with one feature of our invention considerable savings are realized as only half the number of cross points are required as compared to those required for a balanced switch and there is a concomitant saving in the number of control leads for the cross points.

Further in accordance with a feature of our invention, the number of extra control leads required to control the switching network 13 and to test the subscriber lines 12 is reduced to zero by compositing these control leads onto the talking path pair. Thus the direct current path for the line testing signals comprises the line testing and marking circuit 20, a lead 50 connected to one portion 51 of the secondary of a transformer 52, the one wire 21 of the trunk 14, a portion 54 of the primary of the transformer 18, the lead 33, through the translator 16, as described above, the line 32, resistances 55, the one portion 56 of the secondary of transformer 17, one wire of line 12, the subset 10, the other wire of the line 12, and the other portion 57 of the secondary of transformer 18 to ground. A blocking capacitor 60 is interposed between the two portions of each of the transformers to define the direct current path over individual wires while allowing the voice frequency paths to pass through. The line marking circuit is the same except that the line marking potentials are applied through the translator 16, line 32, and the primary 62 of transformer to one side of each of the multipled cross points 30.

The direct current path for the cross point holding current and subscriber loop current is from a supervision circuit 64, described further below, to the other wire 23 of the concentrator trunk 14, through the other portion 65 of the primary of transformer 18, the secondary 66 of the transformer 18, the particular cross point 30 operated, as described above, the primary 62 of the transformer 17, resistances 55, transformer portion 56, subscriber telephone 10, and transformer portion 57 to ground. The trunk marking potentials are similarly applied to the cross points 30 along this direct current path from the supervision circuit 64. It should be noted that in the particular embodiment depicted in Fig. 3 resistances 55 are equivalent to the resistance 47 in the subscriber line in Fig. 2 so that the flow of subscriber subset current through resistances 55 causes a voltage drop across the resistances larger than the voltage $(E_m+E_s)$ to back bias the rectifiers or diodes 34 and allow no current to flow in the line testing circuit during a busy test, as explained further above.

As the direct cross point hold and subscriber loop current flows through both the primary 62 and the secondary portions 56 and 57 of transformer 17 it is possible to cancel out any direct current flux contributions to the transformer by having a 1:1 ratio between the primary and secondary windings. This prevents the transformer core from saturating and allows the use of very small transformers. As each subscriber line 12 is connected to the switching network 13 by a transformer 17, this savings in cost, space and weight in the concentrator unit is appreciable.

Various supervision circuits 64 could be employed in a system in accordance with our invention to applying the trunk marking voltages, cross point holding and subscriber loop current, and ringing signals, and such circuits could be made to follow dial pulses from the subscriber if desired. One simplified supervision circuit 64 is shown in Fig. 3 and can best be understood from a consideration of its operation when it is desired to place a call through to the subscriber, i. e., when the subscriber is at the terminating end of the call being set up. When the operator in the central office desires to set up the call the operator will close a trunk marking switch 70 thereby applying the voltage $-E_t$ to the relay 71 causing its contacts 72, 73, and 74 to close. Closure of contacts 73 applies the marking voltage $-E_t$ to the wire 23 of the concentrator trunk 14 through the windings of a marginal supervisory relay 76 and an auxiliary supervisory relay 77. As the cross point has not yet broken down no current will flow through these windings. It should be noted that in Fig. 2 the whole marking operation was depicted by the closing of the marking switch 38. As will be apparent from the present description the marking switch 70 is not actually the equivalent of the switch 38, but can be considered as equivalent to just one function of the switch, the other functions of the switch 38 being accomplished by other elements of the supervisory circuit 64.

When the cross point breaks down current will be flowing in the windings of each of the relays 76 and 77. This current, however, is small as the telephone is still in an on-hook condition and, while sufficient to operate the auxiliary supervisory relay 77 is insufficient to operate the marginal supervisory relay 76. Operation of relay 77 closes its contacts 78 and 79 thereby completing a circuit from the voltage $-E_t$ through normally closed back contacts 80 on relay 76, the contacts 78 and contacts 72 to the winding of relay 71 so that the marking switch 70 may be released. When the marking switch 70 was closed a ringing switch 81 was opened at the same time so that no ringing currents could be transmitted until the subscriber line was seized. When relay 77 operates, however, and marking switch 70 is released, ringing switch 81 is again closed, and ringing currents may now be transmitted from a ringing signal source 82 through closed contacts 74 of relay 71, closed contacts 79 of relay 77 and coupling capacitor 83, which prevents passage of direct current onto the trunk through this ringing path, onto the one wire 23 of the trunk 14 and thence to the subscriber's telephone 10 over the circuit described above. When the subscriber answers, the current flowing through the relays 76 and 77 is increased, due to the subset now being in the off-hook condition, and this increased current is sufficient to cause relay 76 to operate and transfer from contacts 80 to contacts 85. This applies the holding voltage $-E_t$ directly to the wire 23 of trunk 14 through the windings of relays 76 and 77 and causes the relay 71 to release, thereby interrupting the ringing circuit.

When the subscriber associated with a subscriber line 12 is originating a call, relay 76 is immediately operated on break down of the cross point and relay 71 and the ringing circuit are never connected. Contacts 87 are also provided on the auxiliary supervisory relay 77 to short circuit a coupling capacitor 88 between two portions 89 of the primary of transformer 52 so that direct current test apparatus in the central office switching network 11 can be apprised of when a trunk 14 is being utilized by a subscriber.

As pointed out above the subset 10 employed in a telephone system in accordance with our invention advantageously is such as to have one value of terminating resistance when the telephone is not being used and a different, and advantageously smaller, value of terminating resistance when the subset is in use. Additionally it is desirable that no separate power supply be employed in the concentrator or at the subscriber's premise so that all subset power and cross point holding power must be derived from the concentrator trunk 14 designated to handle the particular call. Therefore all the subset current is passed through the cross point. When the cross point is defined by a transistor or a gas tube it is desirable to limit the cross point current. Two other changes are therefore advantageously made in the telephone subset. Referring now to Fig. 4 there is shown a schematic representation of one particular telephone subset that may advantageously be employed in a telephone system in accordance with our invention. This subset differs from that normally employed in that the ringing current from the ringing signal source 82 instead of actuating a bell in the subset is amplified by a transistor amplifier 91 and applied to the receiver 92. This obviates the necessity for large ringing currents to be transmitted from the central office to actuate a bell. Also when the receiver 92 is removed from the telephone hook 27 the transistor amplifier is then connected to the microphone 93 so that satisfactory speech or voice currents may be transmitted with less power supplied from the central office. When the receiver 92 is in an on-hook position the alternating current ringing path is defined from the wire 12*a* by the contacts 95, the transformer 96, contacts 102, and the transistor amplifier 91 to the inductors 98 and resistance 99 and thus to the receiver 92, as is known in the art. When the receiver 92 is off hook 27 the alternating current speech path for signals generated by the microphone 93 comprises the microphone 93, the contacts 103 and the transistor amplifier 91 to the inductors 98 and 104 which operate then as a hybrid coil to apply the signals to the line, as is known in the art.

In the description of the operation of the line testing functions of a system in accordance with certain features of our invention the telephone was assumed to have a certain resistance 26 when in an on-hook condition and a much lower resistance defined by the resistances 26 and 28 in parallel when the telephone was in an off-hook position. Actually in the specific subset depicted in Fig. 4 the on-hook direct current path is defined from wire 12*a* by the contacts 95, the resistance 101, the coils 98 and resistance 99, the transistor amplifier 91, the transformer 96, and contacts 102 to wire 12*b*. The off-hook direct current path is defined from wire 12*a* by the contacts 105, the inductor 104, the transistor amplifier 91, the contacts 103, and through the microphone 93 to the wire 12*b*. Thus in the specific subset shown the change in resistance between the two direct current paths is mainly due to the inclusion of the resistance 101 and the resistance 99 and inductors 98 in the on-hook condition and their omission from the off-hook direct current path. As the resistance of resistor 101 is advantageously high, as of the order of 7,000 ohms, the resistance of the direct current circuit through the telephone subset is considerably higher when the telephone is idle than when it is in use. Thus the test current indicated in ammeters 48 for an idle line is considerably lower than for a telephone requesting new service, as described further above.

It is to be understood that the above-described arrangements are illustrative of the application of the principles of the invention. Numerous other arrangements may be devised by those skilled in the art without departing from the spirit and the scope of the invention.

What is claimed is:

1. A telephone system comprising a plurality of telephones, a subscriber line connected to each of said telephones, a central office, a plurality of trunks extending from said central office and each comprising a pair of wires, a switching network for connecting any of said lines to any of said trunks and comprising talking paths capable of being set up on application of marking potentials to said lines and said trunks, translator means connected between said lines and one wire of each of said trunks, means for applying a marking potential to the other wire of each of said trunks to mark the central office side of said switching network, and means for applying a marking potential to the line side of said switching network, said last-mentioned means comprising said translator and means for varying the potentials applied to certain of said one wires of said trunks in accordance with the code of said translator.

2. A communication system comprising a plurality of communication apparatuses, a line connected to each of said apparatuses, a central office, a plurality of wires extending from said central office, a plurality of rectifier elements, each of said lines being connected to at least two of said wires by said elements and all of said lines being connected to the same number of wires, means applying a first voltage normally to each of said wires, and means for testing the condition of any one of said lines, said testing means comprising means for applying a second voltage to said wires connected by said rectifier elements to said one line, said first and second voltages being so related that each of said rectifier elements except said elements connectel to said one line is in a nonconducting state whereby the current in said wires connected to said one line is dependent on the condition of said one line alone.

3. A communication system comprising a plurality of lines, a plurality of trunks, the number of said trunks being less than the number of said lines and each of said trunks comprising a pair of wires, a switching network for connecting any of said lines to any of said trunks, said network comprising means defining cross points between said lines and said trunks capable of defining conducting paths on application of marking potentials thereto, a translator connected between one wire of each of said trunks and said lines, means applying a marking potential to the other wire of any of said trunks to mark one side of said switching network, means applying a marking potential to any of said lines to mark the line side of said switching network, said last-mentioned means comprising means for varying the voltage on certain of said one wires connected by said translator to the particular line to be marked, means for testing the condition of any of said lines, said testing means comprising means for varying the voltage on certain of said one wires connected by said translator to the particular line to be tested and means for indicating the flow of current in said particular one wires.

4. A communication system in accordance with claim 3 wherein said translator comprises a plurality of rectifier elements, each of said lines being connected to only a certain number of said one wires of said trunks by said elements in accordance with the equation $$C=\frac{n(n-1)(n-2)\ .\ .\ .\ (n-r+1)}{r!}$$

where C is the total number of lines, $n$ the number of trunks, and $r$ the number of said one wires of said trunks connected by said elements to any one of said lines.

5. A communication system comprising a plurality of lines, a plurality of trunks, a switching network connecting any of said lines to any of said trunks, said switching network comprising a plurality of cross points defining conducting paths through said switching network between any one of said lines and any one of said trunks, a translator network comprising a plurality of rectifier elements, each of said lines being connected by said rectifier elements to at least two of said trunks, means applying a marking voltage to one trunk to mark the trunk side of each of said cross points connected to said one trunk, and means applying a marking potential to one line to mark the line side of each of said cross points connected to said one line, whereby a single conducting path is established between said one trunk and said one line, said last-mentioned means comprising means for varying the voltage on said trunks connected by said rectifier elements to said one line such that the difference between said marking voltages is sufficient to break down said cross points.

6. A communication system in accordance with claim 5 wherein the number of trunks to which each of said lines is connected by said rectifier elements is given by the equation $$C=\frac{n(n-1)(n-2)\ .\ .\ .\ (n-1+r)}{r!}$$

where C is the total number of lines, $n$ the number of trunks, and $r$ the number of trunks connected by said elements to any one of said lines.

7. A telephone system comprising a plurality of telephones, a subscriber line connected to each of said telephones, a central office, a plurality of trunks extending from said central office and each comprising a pair of wires, a switching network for connecting any of said lines to any of said trunks, a plurality of rectifier elements, each of said lines being connected to at least one wire of two of said trunks by said elements and all of said lines being connected to the same number of wires, means applying a first voltage normally to each of said one wires, and means for testing the condition of any one of said lines, said testing means comprising means for applying a second voltage to said one wires connected by said rectifier element to said one line, said first and second voltages being so related that each of said rectifying elements except said elements connected to said one line is in a non-conducting state whereby the current in said one wires connected to said one line is dependent on the condition of said one line alone and means for indicating the current in said one wires.

8. A telephone system in accordance with claim 7 wherein said switching network comprises a plurality of means defining cross points between said lines and said trunks and capable of defining conducting paths on the application of marking potentials thereto, means for applying a marking potential to a second wire of one of said trunks to mark the central office side of certain of said cross points, and means for applying a marking potential to one of said lines to mark the line side of certain of said cross points, said last-mentioned means comprising means for removing said voltages from said one wires having rectifier elements connected to said one line, said trunk marking potential being sufficient to cause said cross points to define said path but the difference between said trunk marking potential and said voltages being insufficient to cause said cross points to define said path.

9. A telephone system comprising a plurality of telephones, a line connected to each of said telephones, a central office, a plurality of trunks extending from said central office, the number of said trunks being less than the number of said lines and each of said trunks comprising a pair of wires, a switching network connected to said lines and said trunks and capable of connecting any of said lines to any of said trunks, a plurality of rectifier elements, each of said lines being connected to one wire of at least two of said trunks and all of said lines being connected to the same number of wires, means applying a first voltage normally to each of said wires, and means for testing the condition of any one of said lines, said testing means comprising means for applying a second voltage to said wires connected by said rectifier elements to said one line, said first and second voltages being so related that each of said rectifier elements except said elements connected to said one line is in a non-conducting state whereby the current in said wires connected to said one line is dependent on the condition of said one line, each of said telephones having one value of resistance when not being used and another when being used, means for back biasing said rectifier elements to prevent flow of current in said trunks when a call has been placed through on said one line, and means indicating the flow of current in said one wires.

10. A telephone system comprising a plurality of telephones, a subscriber line connected to each of said telephones, a central office, a plurality of trunks each comprising a pair of wires extending from said central office, means defining talking path cross points between any one of said lines and any one of said trunks, a plurality of rectifier elements, each of said lines being connected to a first line of at least two of said trunks by said elements, means applying a first voltage normally to each of said first wires, means for testing the condition of one of said lines, said testing means comprising means for applying a second voltage to said first wires connected by said rectifier elements to said one line, said first and second voltages being so related that each of said rectifier elements except said elements connected to said one line is in a non-conducting state whereby the current in said first wires connected to said one line is dependent on the condition of said one line alone, each of said telephones having one resistance when not being used and a different resistance when being used, means for back biasing said rectifier elements to prevent flow of current in said first wires when a call has been placed through on said one line, means for applying a marking potential to a second wire of one of said trunks to one side of each of said cross points associated with said one trunk, and means applying a marking potential to one side of each of said cross points associated with said one line, whereby a single path is determined by said cross points between said one trunk and said one line, said last-mentioned means comprising means for removing said voltages from said first wires having rectifier elements connected to said one line, said trunk marking potential being sufficient to cause said cross points to define said path but the difference between said trunk marking potential and said voltages being insufficient to cause said cross points to define said path.

11. A remote line concentrator telephone system comprising a central office, a plurality of concentrator trunks extending from said central office, each of said trunks comprising a balanced pair of wires, a plurality of first transformers having their primaries connected across the ends of each of said concentrator trunks, said primaries each comprising two portions, a switching network, a plurality of leads connecting one side of each of the secondaries of said first transformers to said switching network, a plurality of second transformers having primaries comprising two portions, a plurality of leads connecting one side of each of the primaries of said second transformers to said switching network, a plurality of subscriber lines each connected across the secondaries of said second transformers, a telephone instrument connected to each of said subscriber lines, a translator network comprising a plurality of translator lines connected to one portion of the primary of each of said first transformers, a plurality of translator leads each connected to the primary of said second transformers and to one portion of the secondary of said second transformers, and a plurality of rectifier elements, each of said translator leads being connected to at least two of said translator lines by said rectifier elements and all of said translator leads being connected to the same number of translator lines, means including one wire of each of said concentrator trunks, said one portion of the primary of each of said first transformers, said translator lines, and said translator network defining a direct current circuit for subscriber line test and mark signals, means including the other wire of each of said concentrator trunks, a second portion of the primary of each of said first transformers, and the secondary of each of said first transformers defining a direct current circuit for trunk marking signals and switching network holding and subscriber loop current, means for applying trunk marking potentials to said other wire of each said concentrator trunks, and means for applying line marking potentials to the one wire of each of said concentrator trunks and for causing certain of said rectifier elements to conduct to determine the condition of the particular subscriber line connected to said certain rectifier elements.

12. A telephone system comprising a plurality of telephones, a subscriber line connected to each of said telephones, a central office, a plurality of trunks extending from said central office, a switching network for connecting any of said trunks to any of said lines, a translator network connected to said lines and comprising a plurality of rectifier elements, each of said lines being connected to at least two individual rectifier elements and all of said lines being connected to the same number of rectifier elements, means for applying voltages from said central office to said rectifier elements, means for varying the voltages applied to said rectifier elements connected to a particular line to test the condition of said line, said voltages being so related that each of said rectifying elements is in a non-conducting state except said elements connected to said particular line, whereby the current through said translator network is dependent on the condition of said particular line alone, and means in said central office indicating the current through said translating network.

13. A telephone system comprising a plurality of telephones, a subscriber line connected to each of said telephones, a central office, a plurality of trunks extending from said central office, a switching network for connecting any of said trunks to any of said lines, a translator network connected to said lines and comprising a plurality of rectifier elements, each of said lines being connected to at least two individual rectifier elements and all of said lines being connected to the same number of rectifier elements, means including said trunks for applying voltages from said central office of said rectifier elements, and means for testing the condition of any one of said lines comprising means for varying the voltages applied to said rectifier elements connected to said one line, said voltages being so related that each of said rectifying elements is in a non-conducting state except said elements connected to said particular line whereby the current in said trunks from said translator network is dependent on the condition of said particular line alone, and means in said central office indicating the current in said trunks from said translating network.

14. A telephone system comprising a plurality of telephones, a subscriber line connected to each of said telephones, a central office, a plurality of trunks extending from said central office, a switching network connecting any of said lines to any of said trunks, said switching network comprising a plurality of cross points defining conducting paths through said switching network between any one of said lines and any one of said trunks, a translator network comprising a plurality of rectifier elements, each of said lines being connected to at least two of said rectifier elements and all of said lines being connected to the same number of rectifier elements, means applying a marking potential to one trunk to mark the trunk side of each of said cross points connected to said one trunk, means applying a marking potential to one line to mark the line side of each of said cross points connected to said one line, whereby a single conducting path is established between said one trunk and said one line, said last mentioned means comprising means for applying voltages from said central office to said rectifier elements and means for varying said voltages on said elements connected to said one line such that the difference between said marking potentials is sufficient to break down said single conducting path, and means for testing the condition of any one of said lines, said testing means comprising means for varying the voltages applied to said rectifier elements connected to said one line, said voltages applied to said elements being so related that each of said rectifier elements is in a non-conducting state except said elements connected to said one line whereby the current through said translator network is dependent on the condition of said one line alone, and means in said central office indicating said current through said translating network.

15. A telephone system comprising a plurality of telephones, a subscriber line connected to each of said telephones, a central office, a plurality of trunks extending from said central office, a switching network connecting any of said lines to any of said trunks, said switching network comprising a plurality of cross points defining conducting paths through said switching network between any one of said lines and any one of said trunks, a translator network comprising a plurality of rectifier elements, each of said lines being connected by at least two of said rectifier elements to certain of said trunks and all of said lines being connected to the same number of rectifier elements, means applying a marking potential to one trunk to mark the trunk side of each of said cross points connected to said one trunk, means applying a marking potential to one line to mark the line side of each of said cross points connected to said one line, whereby a single conducting path is estalished between said one trunk and said one line, said last mentioned means comprising means for applying voltages from said central office to said rectifier elements over certain of said trunks and means for varying said voltages on said rectifier eelments connected to said one line such that the difference between said marking potentials is sufficient to break down said single conducting path, and means for testing the condition of any one of said lines, said testing means comprising means for varying the voltages applied to said rectifier elements connected to said one line, said voltages applied to said elements being so related that each of said rectifier elements is in a non-conducting state except said elements connected to said one line whereby the current in said trunks from said translator network is dependent on the condition of said one line alone, and means in said central office indicating said current in said trunks from said translator network.

16. A telephone system comprising a plurality of telephones, a subscriber line associated with each of said telephones, a central office, a plurality of trunks extending from said central office, switching means defining talking path cross points between any one of said lines and any one of said trunks, a plurality of rectifier elements, each of said lines being connected to at least two of said trunks by said rectifier elements, means applying a first voltage normally to said elements, means for testing the condition on any one of said lines, said testing means comprising means for applying a second voltage to said rectifier elements connected to said one line, said first and second voltages being so related that each of said rectifier elements except said elements connected to said one line is in a non-conducting state whereby the current in said trunks from said rectifier elements is dependent on the condition of said one line alone, each of said telephones having one resistance when not being used and a different resistance when being used, means for back biasing said rectifier elements to prevent flow of current therethrough when a call has been placed through on any of said lines, means for applying a marking potential to one of said trunks to mark the trunk side of each of said cross points connected thereto, and means for applying a marking potential to one side of each of said cross points connected to a particular line, whereby a single path is determined by said cross points between said one trunk and said particular line, said last mentioned means comprising means for varying the voltages applied to said rectifier elements connected to said particular line, the difference between said marking potentials being sufficient to break down said single conducting path.

References Cited in the file of this patent

UNITED STATES PATENTS

| | | |
|---|---|---|
| 2,532,097 | Hersey | Nov. 28, 1950 |
| 2,543,534 | Powell | Feb. 27, 1951 |